United States Patent Office 3,046,274
Patented July 24, 1962

3,046,274
PROCESS OF PREPARING α-HALOGENATED AMINES
Horst Böhme, Marburg (Lahn), and Klaus Hartke, Lank, Lower Rhine, Germany, assignors to Farbwerke Hoechst Aktiengesellschaft vormals Meister Lucius & Brüning, Frankfurt am Main Hochst, Germany, a company of Germany
No Drawing. Filed Aug. 19, 1959, Ser. No. 834,682
Claims priority, application Germany Aug. 28, 1958
1 Claim. (Cl. 260—247)

Now it has been found that α-halogenated amines of the general formula

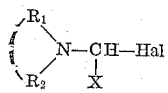

in which $R_1$ and $R_2$ represent alkyl- or phenyl-alkyl radicals or together with the nitrogen atom the residue of a hydrogenated heterocyclic ring system, X stands for hydrogen, an aliphatic or aromatic hydrocarbon radical and Hal for a halogen atom that may be bound in a complex form, are obtained in an excellent yield and in a very pure state, by reacting compounds of the general formula

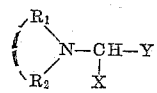

in which $R_1$, $R_2$ and X have the meanings given above and Y represents the groupings

and

—O—$R_5$ in which $R_3$ and $R_4$ have the meanings given for $R_1$ and $R_2$, and $R_5$ stands for an aliphatic or aromatic hydrocarbon radical, in the presence of solvents and with exclusion of atmospheric moisture with acid halides of the general formula R—CO—Hal, in which R means an unsubstituted or substituted, aliphatic or aromatic residue that may be linked to the carbonyl group through a hetero atom.

When using acid chlorides, bromides or iodides as starting substances, the reaction proceeds according to the following scheme

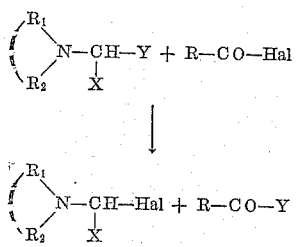

in which formulae $R_1$, $R_2$, X and Y have the meanings given above.

When using acid fluorides as starting substances, it is suitable to increase their reactivity by addition of compounds being able to bind the fluoride anion in a complex form. As such compound there may be mentioned boron trifluoride.

The process of the present invention is easily practicable since, by simply combining solutions of the reactants, the desired products precipitate at once in a crystalline form. The α-halogenated amines can be isolated from the reaction mixture by simple filtering in a very good state of purity and in an excellent yield.

As by-products there are formed during the reaction carboxylic acid amides of the general formula

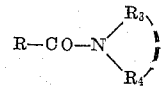

or carboxylic acid esters of the general formula R—CO—O—$R_5$, in which R, $R_3$, $R_4$ and $R_5$ have the meanings given above, which, owing to their good solubility in organic solvents, can be separated without difficulty from the salt-like α-halogenated amines mostly being insoluble in inert solvents.

The reaction is normally carried out at room temperature. If desired, however, it may also be carried out with cooling or at an elevated temperature.

As starting substances containing the grouping represented by the symbol Y there may be mentioned:
N,N,N',N'-tetramethyl-methylene-diamine,
N,N,N',N'-tetraethyl-methylene-diamine,
N,N,N',N'-tetra-n-propyl-methylene-diamine,
N,N,N',N'-tetra-isopropyl-methylene-diamine and
N,N,N',N'-tetra-n-butyl-methylene-diamine,
1,1-bis-(dimethyl-amino)-ethane,
1,1-bis-(methyl-isopropyl-amino)-propane,
1,1-bis-(diethylamino)-propane,
1,1-bis-(diethylamino)-n-butane,
1,1-bis-(dimethylamino)-benzylidene and
1,1-bis-piperidino-benzylidene.

Furthermore, there come also into consideration: dimethylaminomethyl-ethyl ether, diethylaminomethyl-methyl ether, di-n-butylaminomethyl-n-butyl ether and morpholino-1-isobutylidene-1-n-butyl ether.

The substituents in the amino group may be low molecular or also high molecular alkyl radicals. The alkyl radicals may also be substituted by phenyl groups thus representing phenyl-alkyl radicals of which the benzyl radical may particularly be mentioned. Two alkyl radicals each can also form together with the nitrogen atom the residue of a hydrogenated heterocyclic ring system, for example a piperidino-, α-methyl-piperidino-, pyrrolidino- or morpholino residue. There may for example be mentioned: 1,1-bis-piperidino-methane, 1,1-bis-piperidino-ethane, 1,1-bis-pyrrolidino-n-propane, 1,1-bis-morpholino-methane and 1,1-bis-morpholino-isobutane. It is not necessary that all residues bound to the nitrogen atoms be identical, they may also be different. As such compounds there may be mentioned by way of example: bis-(methyl-benzylamino)-methane or methyl-benzyl-aminomethyl-ethyl ether. In addition, there may also be used compounds in which one nitrogen atom may be substituted by other radicals than the other nitrogen atom, for example: 1-dimethylamino-1-(di-isopropyl-amino)-ethane and 1-(methyl-isobutylamino)-1-piperidino-isobutane.

The substituent X can be any desired aliphatic or aromatic hydrocarbon radical, the aliphatic radicals being of straight or branched chain. However, there are preferably used low-molecular alkyl radicals containing from 1 to 4 carbon atoms, inclusive, such as methyl, ethyl, n-propyl, isopropyl and the various isomeric butyl radicals. As aromatic hydrocarbon radical there comes above all into consideration the phenyl radical that may carry further substituents. The radicals $R_5$ linked to oxygen may be of aliphatic or aromatic nature; there are preferably used low molecular aliphatic radicals containing from 1 to 4 carbon atoms, inclusive, such as methyl, ethyl, propyl, n-butyl and isobutyl.

As acid halides of the formula R—CO—Hal may be mentioned, for example: acetyl fluoride, acetyl chloride, acetyl bromide, acetyl iodide, propionyl chloride (bromide, iodide), butyryl fluoride, chloride, bromide, iodide, benzoyl chloride, benzoyl iodide, trichloracetyl fluoride, chloroformic acid ethyl ester etc.

As solvents there are suitable such compounds as do not react with the acid halides and α-halogenated amines and in which the last mentioned substances are sparingly soluble whereas the by-products, viz. the said carboxylic acid amides or carboxylic acid esters, are easily soluble therein. There are advantageously used for example alicyclic and cyclic ethers such as diethyl ether, dioxane, tetrahydrofurane; other inert solvents such as methylene chloride, chloroform and the like are also suitable.

The products of the process of this invention are valuable intermediate products for the synthesis of medicaments and other products. From N-chloro-methyl-pyrrolidine and tetracycline base there can, for example, be prepared the pyrrolidino-methyl-tetracycline that, owing to its outstanding properties, particularly its good water-solubility, represents a valuable antibiotic of the tetracycline series that can be administered per os, intravenously and intramuscularly.

The following examples serve to illustrate the invention but they are not intended to limit it thereto:

EXAMPLE 1

N-Chloromethyl-Diethylamine 3.1 grams of benzoyl chloride in 20 cc. of ether are added dropwise, while slightly moving the reaction vessel, at room temperature, to 3.2 grams of tetraethyl-diamino-methane. The crystals that have separated are filtered off with suction, washed with ether and dried at 40° C. under reduced pressure at the oil pump. The yield amounts to 2.2 grams (=89% of the theoretical yield). The substance is obtained in the form of colorless crystals that deliquesce in the air while yielding formaldehyde.

$CH_2O$: Calculated 24.68%; found 23.7%. Cl: Calculated 29.16%; found 29.2%.

EXAMPLE 2

N-Chloromethyl-Di-n-Butylamine

In the manner described in Example 1 there are obtained from 5.4 grams of tetra-n-butyl-diamino-methane and from 1.6 grams of acetyl chloride 3.0 grams (=85% of the theoretical yield) of chloro-methyl-di-n-butylamine in the form of colorless needles that are sparingly soluble in ether and deliquesce very rapidly in the air while yielding formaldehyde.

$CH_2O$: Calculated 16.89%; found 16.6%. Cl: Calculated 19.95%; found 19.2%.

EXAMPLE 3

N-Chloromethyl-Piperidine

In the manner described in Example 1 there are obtained from 3.6 grams of bis-piperidino-methane and 1.6 grams of acetyl chloride 2.4 grams (=90% of the theoretical yield) of N-chloromethyl-piperidine. The substance forms colorless crystals that deliquesce in the air while yielding formaldehyde.

$CH_2O$: Calculated 22.46%; found 21.8%. Cl: Calculated 26.54%; found 26.4%.

EXAMPLE 4

N-(α-Chlorobenzyl)-Piperidine

From 5.2 grams of bis-piperidino-benzylidene and 1.7 grams of acetyl chloride there are obtained in the manner described in Example 1, 3.8 grams (=91% of the theoretical yield) of N-(α-chlorobenzyl)-piperidine in the form of colorless needles that deliquesce in the air while a smell of benzaldehyde is observed.

$C_6H_5CHO$: Calculated 50.57%; found 49.8%. Cl: Calculated 16.90%; found 17.1%.

EXAMPLE 5

N-(α-Chlorobenzyl)-Dimethylamine

From 3.6 grams of bis-dimethylamino-benzylidene and 2.4 grams of chloroformic acid ethyl ester there are obtained according to Example 1, 3.1 grams (=91% of the theoretical yield) of α-chlorobenzyl-dimethylamine in the form of small, colorless crystals that deliquesce in the air while a smell of benzaldehyde is observed.

$C_6H_5CHO$: Calculated 62.52%; found 61.4%. Cl: Calculated 20.89%; found 21.4%.

EXAMPLE 6

N-(α-Bromoisobutyl)-Morpholine

According to Example 1 there are obtained from 4.3 grams of (α-N-morpholino-isobutyl)-n-butyl ether and 2.6 grams of acetyl bromide, 4.0 grams (=93% of the theoretical yield) of N-(α-bromo-isobutyl)-morpholine in the form of small, colorless crystals that deliquesce in the air while a smell of isobutyraldehyde is observed.

$C_3H_7CHO$: Calculated 32.46%; found 31.6%. Br: Calculated 35.98%; found 36.1%.

EXAMPLE 7

N-Bromomethyl-Di-n-Propylamine

A solution of 2.7 grams of acetyl bromide (0.022 mol) in 25 cc. of absolute ether is added dropwise, while slowly moving the reaction vessel and completely excluding atmospheric moisture, to 4.28 grams of tetra-n-propyl-diamino-methane (=0.02 mol) in 75 cc. of absolute ether. A white crystalline precipitate separates immediately. After standing for 30 minutes, the precipitate is transferred under nitrogen and at room temperature to a sintered-glass suction filter, vacuum filtered and carefully washed 4 times with 15–20 cc. each of absolute ether. The residual solvent is sucked off in a drying flask at 40° C. under reduced pressure. There are obtained 3.55 grams (=92% of the theoretical yield) of the reaction product in the form of small white crystals that deliquesce in the air while yielding formaldehyde.

$CH_2O$: Calculated 15.45%; found 15.2%. Br: Calculated 41.2; found 41.3%.

EXAMPLE 8

N-Iodomethyl-Piperidine

A solution of 3.64 grams of bis-piperidino-methane (0.02 mol) in 80 cc. of absolute ether is transferred to a flask filled with dry nitrogen and in the course of 30 minutes there is added dropwise at room temperature a mixture of 5.1 grams of benzoyl iodide (0.022 mol) in 20 cc. of absolute ether. A weakly yellow, crystalline precipitate separates at once. The precipitate is transferred to a sintered-glass suction filter, washed carefully 3 times with 20 cc. each of ether and dried for about 1 hour at 40° C. under reduced pressure. There are obtained 4.1 grams (=91% of theoretical yield) of the reaction product in the form of white to weakly yellow crystals that deliquesce in the air within a short time while yielding formaldehyde.

$CH_2O$: Calculated 13.3%; found 13.1%. I: Calculated 56.4%; found 55.8%.

EXAMPLE 9

N-(α-Iodobenzyl)-Dimethylamine 3.56 grams of bis-dimethylamino-benzylidene (0.02 mol) are dissolved in 80 cc. of absolute ether and transferred into a reaction vessel filled with nitrogen. Within 30 minutes there is added dropwise at room temperature, while moving the vessel, a mixture of 5.1 grams of benzoyl iodide (0.022 mol) and 20 cc. of absolute ether. Yellowish crystals precipitate already upon addition of the first drops. When the reaction is complete, the precipitate is transferred to a sintered-glass suction filter, washed 3 times with 20 cc. each of absolute ether and then dried in a drying flask for one hour at 40° C. under reduced pressure at the oil pump. There are obtained 4.35 grams (=83% of the theoretical yield) of the reaction product in the form of yellow crystals that deliquesce in the air while yielding benzaldehyde.

$C_6H_5CHO$: Calculated 40.6%; found 39.6%. I: Calculated 48.6%; found 48.6%.

EXAMPLE 10

Morpholino-N-Methyl-Tetra-Fluoroborate

A solution of 3.72 grams of bis-morpholino-methane (0.02 mol) and 3.63 grams of trichloracetyl fluoride (0.022 mol) in 50 cc. of absolute ether is transferred to a dry flask filled with nitrogen. Within 30 minutes a mixture of 3.1 grams of boron fluoride etherate in 20 cc. of absolute ether is slowly added dropwise at room temperature, while moving the reaction vessel. The reaction product separates at once in the form of an oil, but crystallizes completely while the reaction proceeds. The crystals that have separated are transferred to a sintered-glass suction filter, washed 4 times with 10–15 cc. each of absolute ether and dried for 1 hour at 40° C. under reduced pressure at the oil pump. There are obtained 3.1 grams (=83% of the theoretical yield) of the product in the form of white to weakly pink crystals that deliquesce in the air while yielding formaldehyde.

$CH_2$: Calculated 16.0%; found 15.9%. $BF_4$: Calculated 46.5%; found 45.4%.

EXAMPLE 11

Piperidino-N-Methyl-Tetrafluoroborate 1.98 grams of n-butyric acid fluoride (=0.022 mol) and 3.1 grams of boron fluoride etherate (=0.22 mol) are transferred together with 30 cc. of absolute ether into a dry reaction flask filled with nitrogen. Within 15 minutes there are added dropwise, while moving the reaction vessel, 3.64 grams of bis-piperidino-methane (0.02 mol) in 15 cc. of absolute ether. The reaction proceeds with strong evolution of heat. The reaction product separates at first in the form of fine oily drops that slowly crystallize throughout while the reaction proceeds. The precipitate is allowed to stand at room temperature for about 30 minutes, transferred to a sintered-glass suction filter and washed 4 times with 10 cc. each of absolute ether. The residual solvent is removed by drying under reduced pressure at the oil pump. There are obtained 2.7 grams (=73% of the theoretical yield) of the reaction product in the form of white crystals that deliquesce in the air while yielding formaldehyde.

$CH_2O$: Calculated 16.2%; found 16.15%. $BF_4$: Calculated 46.9%; found 46.0%.

EXAMPLE 12

N-Bromomethyl-Benzyl-Methylamine 5.08 grams of N,N'-dibenzyl-N,N'-dimethyl-diamino-methane (0.02 mol) are dissolved in absolute ether and transferred into a dry reaction flask filled with 40 cc. of absolute ether. To the mixture there are slowly added dropwise, while moving the reaction flask, 2.7 grams of acetyl bromide (0.022 mol) in 20 cc. of absolute ether. The N-bromomethyl-benzyl-methylamine formed during the reaction separates at first at the glass wall in the form of colorless drops that crystallize after 15 to 20 minutes. After standing for about 30 minutes at room temperature, the reaction mixture is filtered off with suction at room temperature and under nitrogen and the crystalline residue is washed 4 times with 20 cc. each of absolute ether. The residue is then dried for one hour at 40° C. under reduced pressure at the oil pump. There are obtained 3.7 grams (=86% of the theoretical yield) of the reaction product in the form of small, colorless, needle-like crystals that deliquesce in the air while yielding formaldehyde.

$CH_2O$: Calculated 14.0%; found 13.6%. Br: Calculated 37.3%; found 36.9%.

We claim:

A process of preparing tertiary N-α-halogeno-alkyl-amine derivatives of the formula

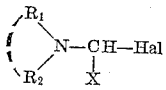

wherein $R_1$ and $R_2$ taken along are members selected from the group consisting of alkyl radicals containing 1 to 4 carbon atoms and benzyl, and taken together with the nitrogen atom are members selected from the group consisting of pyrrolidino, piperidino, 2'-methyl-piperidino, and morpholino rings, X is a member selected from the group consisting of hydrogen, alkyl radicals containing 1 to 4 carbon atoms, and phenyl, and Hal is a member selected from the group consisting of chlorine, bromine and iodine, which process comprises reacting in the presence of an inert organic solvent and with exclusion of atmospheric moisture a compound of the formula

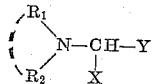

wherein $R_1$, $R_2$ and X have the meanings given above and Y is a member selected from the group consisting of

and

wherein $R_3$ and $R_4$ have the meanings indicated for $R_1$ and $R_2$, and $R_5$ is an alkyl group containing 1 to 4 carbon atoms, with a carboxylic acid halide of the formula R—CO—Hal wherein R is a member selected from the group consisting of alkyl radicals containing 1 to 3 carbon atoms, ethoxy, phenyl, and trichloro-methyl, and Hal has the meaning given above.

References Cited in the file of this patent

Bohme et al.: German Patent Specification #F 155,68 IVb/12q (2 pages), Aug. 26, 1954.